US010266222B2

United States Patent
McKenzie

(10) Patent No.: US 10,266,222 B2
(45) Date of Patent: Apr. 23, 2019

(54) BICYCLE RACK AND BAG

(71) Applicant: ARKEL INC., Sherbrooke (CA)

(72) Inventor: Paul McKenzie, Sainte-Catherine-de-Hatley (CA)

(73) Assignee: ARKEL INC., Sherbrooke (CA)

( * ) Notice: Subject to any disclaimer, the term of this patent is extended or adjusted under 35 U.S.C. 154(b) by 0 days.

(21) Appl. No.: 15/702,189

(22) Filed: Sep. 12, 2017

(65) Prior Publication Data

US 2018/0072361 A1    Mar. 15, 2018

Related U.S. Application Data

(60) Provisional application No. 62/393,342, filed on Sep. 12, 2016.

(51) Int. Cl.
*B62J 9/00* (2006.01)
*B62J 7/04* (2006.01)

(52) U.S. Cl.
CPC ............... *B62J 9/006* (2013.01); *B62J 7/04* (2013.01)

(58) Field of Classification Search
CPC ... B60R 9/006; B60R 7/04; B62J 11/00; B62J 9/006; B62J 9/001; B62J 9/00
USPC ....................................................... 224/427
See application file for complete search history.

(56) References Cited

U.S. PATENT DOCUMENTS

| | | | | |
|---|---|---|---|---|
| 4,030,648 A * | 6/1977 | Johnson | ............. | B62J 1/16 224/415 |
| 4,643,343 A * | 2/1987 | Goldman | ............. | B62J 9/006 224/275 |
| 5,655,694 A * | 8/1997 | Keckeisen | ............. | B62J 9/006 224/275 |
| 6,045,021 A * | 4/2000 | Stites | ............. | B62J 7/04 224/426 |
| 6,997,470 B2 * | 2/2006 | Clutton | ............. | B62J 1/08 280/287 |
| 7,318,623 B2 * | 1/2008 | Shook | ............. | B62J 1/08 297/195.1 |
| 8,007,041 B2 * | 8/2011 | Tisue | ............. | B62J 1/08 297/195.1 |
| 8,919,627 B2 * | 12/2014 | Brinkley | ............. | B60P 3/10 224/519 |

* cited by examiner

*Primary Examiner* — Adam J Waggenspack
(74) *Attorney, Agent, or Firm* — Norton Rose Fulbright Canada LLP

(57) ABSTRACT

A cycle rack comprises a seat attachment assembly configured for attachment of the rack to rails of a seat. A seat post interface is configured to abut a seat post. A frame has a bag interfacing portion adapted to support a bag, a front end portion connected to the seat post interface, and a pair of elongated frame members extending from the front end portion to the bag interfacing portion. A pair of sliders are connected to the seat attachment assembly, each of the sliders forming a channel for each individually receiving therein a respective one of the elongated frame members so as to allow sliding movement of the elongated frame members relative to the sliders.

18 Claims, 18 Drawing Sheets

Fig. 7
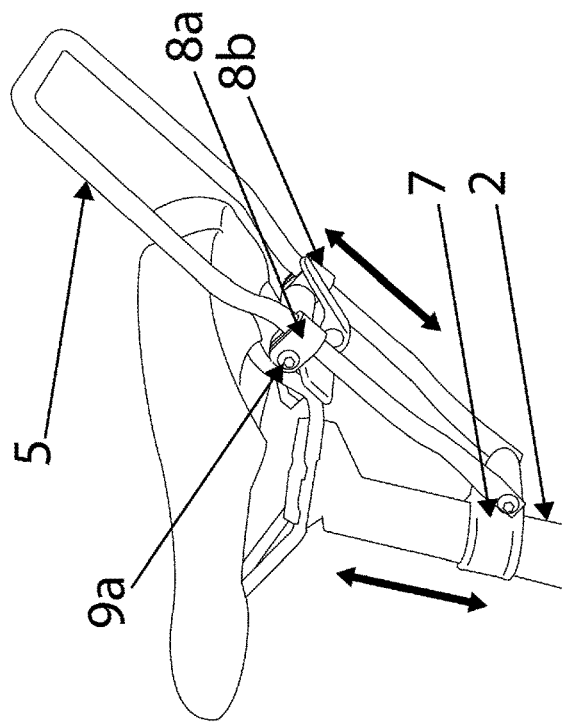
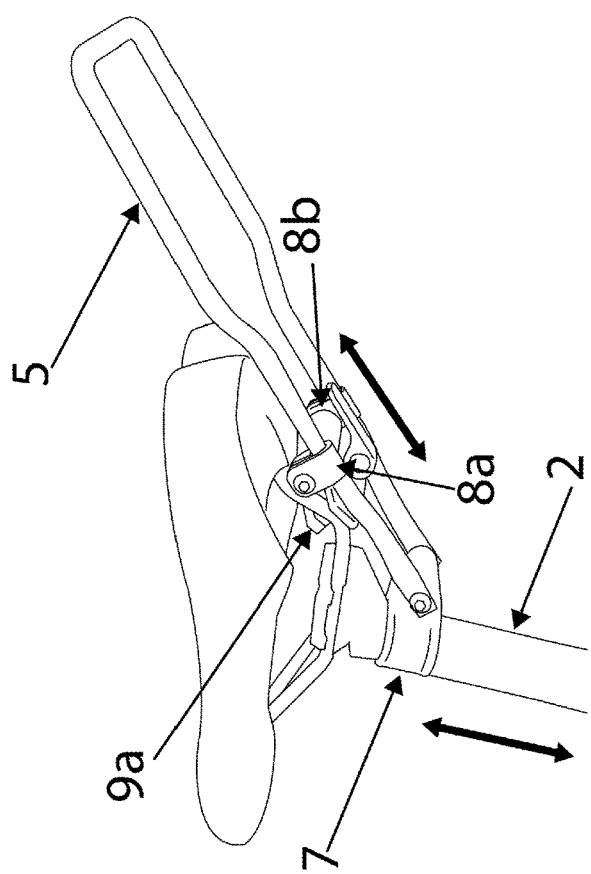

BICYCLE RACK AND BAG

CROSS-REFERENCE TO RELATED APPLICATION

The present application claims the priority of U.S. Patent Application Ser. No. 62/393,342, filed on Sep. 12, 2016 and incorporated herein by reference.

FIELD OF THE INVENTION

The present disclosure generally relates to a rack or like connection system to attach a bag or container to the rear of bicycles, motorcycles and like vehicles.

BACKGROUND OF THE INVENTION

Touring on two-wheel vehicles has been around for a very long time. Specifically, self-propelled cycling has been practiced for different reasons, i.e., recreational, commuting, delivering goods, racing, etc. Cycling often involves carrying luggage, and various equipment and accessories have been developed to meet this need. For instance, racks have been designed to attach to bicycles so that bags of various sizes may be quickly hooked on and off a bicycle. The weight of such bags and accessories that are attached to a bicycle is an important issue as a self propelled rider needs to carry all that is attached to the bicycle up and down hills.

A new trend called "bikepacking" has recently evolved with a view to reducing as much as possible the weight of the accessories that are used to carry one's belongings on a bicycle. In "bikepacking", full-fledged metal racks that were formerly used to attach the bags to the bicycles are eliminated and the bags are cinched directly to various parts of the bike by means of mechanical attachments such as straps, buckles, velcros, snaps and such.

One of the most convenient locations to fit a bag on a bicycle is the space underneath and/or rearward of the seat, extending over the rear wheel. Many types of bicycle racks have been devised to accommodate bags to fit in this space. However, in bikepacking, the rack has been eliminated and bags connect directly to the bicycle by means of straps, buckles and Velcro® to available attachment points, such as the seat post and the seat rails. These attachment points are located fairly close together and connect mainly to the front of the bag while the main body of the bag extends in cantilever fashion over the rear wheel. While the bike rack has been eliminated, a resulting drawback is that of the limited lateral and vertical stability of the cantilevered portion of the bag. Secondly, installation of the bag may be arduous as straps have to be threaded over the seat rails in order for the straps to straddle the rails in the tight space underneath the saddle. In practical terms, while there would be a frequent need to remove the bag off the bike, users of this type of bags tend to consider them as semi-permanently attached and forego the usefulness of removing them from the bike.

SUMMARY OF INVENTION

Therefore, in accordance with the present disclosure, there is provided a connection system for bikepacking that addresses issues related to the prior art.

In accordance with an embodiment of the present disclosure, there is provided a cycle rack comprising: a seat attachment assembly configured for attachment of the rack to rails of a seat; a seat post interface configured to abut a seat post; a frame having a bag interfacing portion adapted to support a bag, a front end portion connected to the seat post interface, and a pair of elongated frame members extending from the front end portion to the bag interfacing portion; a pair of sliders connected to the seat attachment assembly, each of the sliders forming a channel for each individually receiving therein a respective one of the elongated frame members so as to allow sliding movement of the elongated frame members relative to the sliders.

In accordance with another embodiment of the present disclosure, there is provided a cycle rack comprising: a seat attachment assembly configured for attachment of the rack to rails of a seat; a seat post interface configured to abut a seat post; a frame having a bag interfacing portion adapted to support a bag, a front end portion connected to the seat post interface, and at least one elongated frame member extending from the front end portion to the bag interfacing portion, the at least one elongated frame member being arcuate; and at least one slider connected to the seat attachment assembly, and forming a channel for receiving therein the elongated frame member so as to allow sliding movement of the elongated frame members relative to the slider.

Further improvement to the prior art is needed and the present disclosure resolves issues described above. According to an embodiment, a light and rigid frame is for instance slidingly connected to a pivoting bracket that is clamped to the seat rails by way of a quick release mechanism. The front of the frame is connected for instance to a second pivoting bracket that attaches to the seat post. Different means of securing the bag to the frame are possible. A bag is for instance fitted with a sleeve pocket that slides onto the frame and an attachment wraps for instance around the seat post to lock the bag in place. The rack provides for instance lateral and vertical stability to the bag while installation and removal of the bag and of the frame are for instance kept quick and easy.

BRIEF DESCRIPTION OF THE FIGURES

FIG. 7 is a perspective sequence of views showing movement of the bicycle rack of FIG. 1 relative to the bicycle;

DETAILED DESCRIPTION

Figure 1:
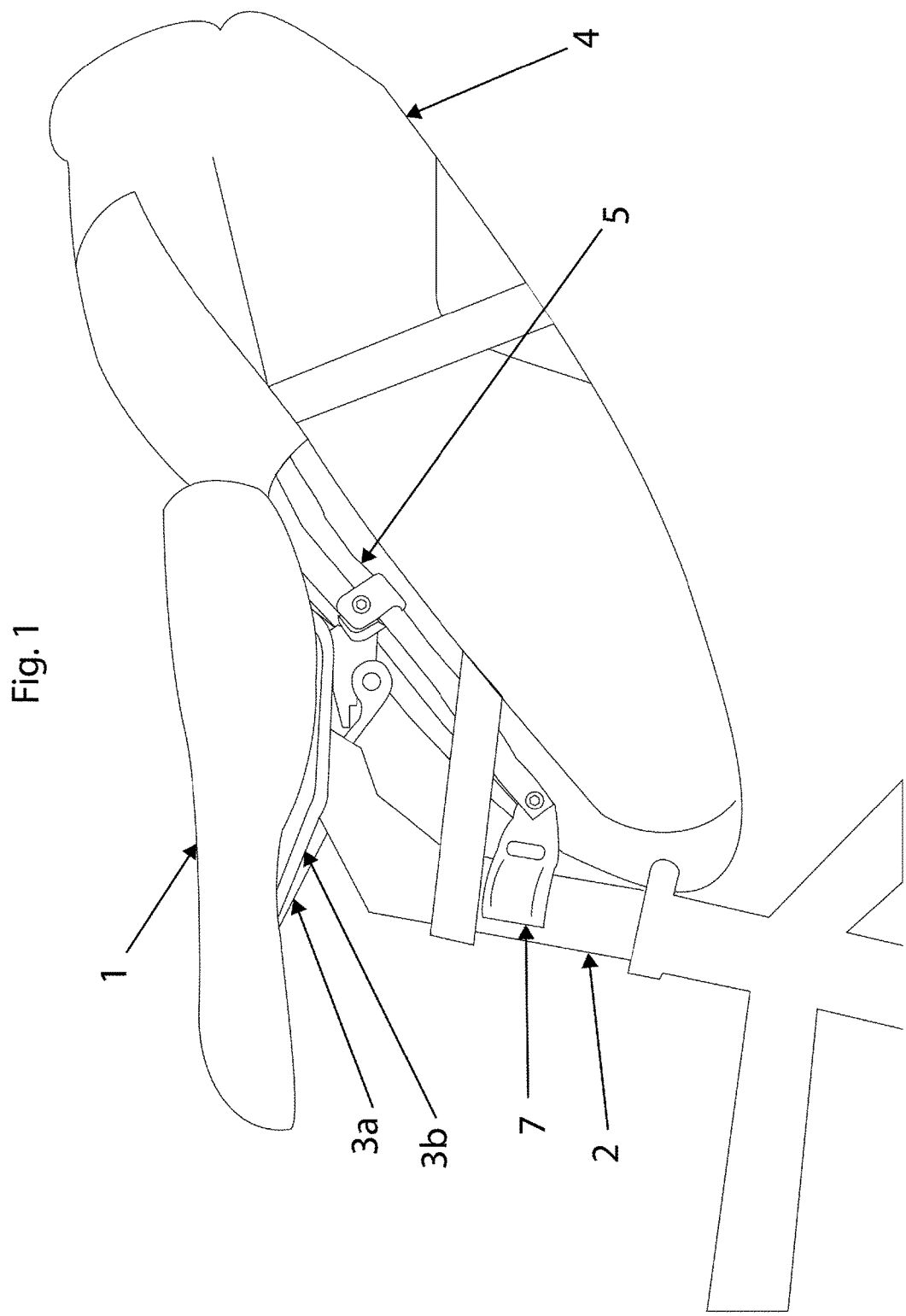
FIG. 1 is a perspective view of a bicycle rack in accordance with an embodiment of the present disclosure, with a bag and as mounted to a bicycle.

Referring to the drawings and more particularly to FIG. 1, there is shown a bicycle rack A by which a bag 4 is installed in a final and stable position at the rear of a bicycle, underneath seat 1 and extending over the rear wheel of a bicycle. In the Figures, a bicycle is shown as the vehicle supporting the bag 4. However, the bag 4 and rack A interfacing the bag 4 with the vehicle can be used on other types of vehicles, including tricycles, motorcycles, etc. For simplicity, the following description makes reference to a bicycle although other vehicles may use the system of the present disclosure. Moreover, although bag 4 is shown as being of the soft-shell type (e.g., pannier, pouch), other types of containers may be connected to a vehicle with a frame 5 of the bike rack A Bag 4 is attached to the frame 5 which is in turn attached to seat rails 3a and 3b that run underneath and are an integral part of seat 1. The frame 5 is separate from and not to be confused with the frame of the vehicle, and is also known as platform.

Figure 2:
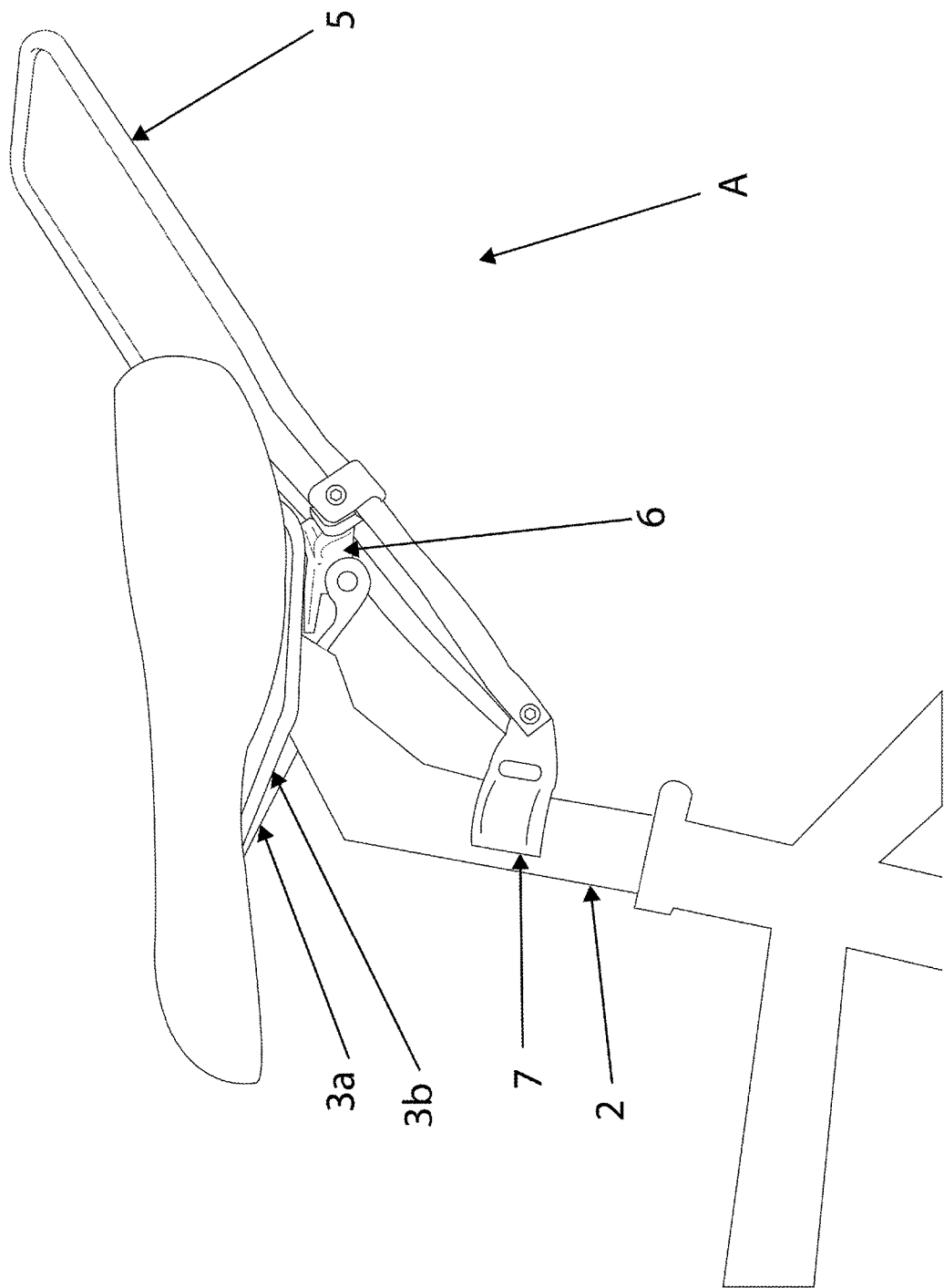
FIG. 2 is a front perspective view of the bicycle rack of FIG. 1, with bag removed.

FIG. 2 shows the frame 5 with the bag 4 removed, to illustrate one possible way by which the frame 5 is attached to seat rails 3a and 3b, namely by means of a seat attachment assembly described as a seat rails pivot bracket assembly 6. The front of frame 5 is connected to the seat post via a seat post pivot bracket 7 that abuts against seat post 2. The seat post 2 is part of the vehicle. In an embodiment, the seat post 2 is an integrated seat mast that forms part of the frame of the vehicle. In another embodiment, the seat post pivot bracket 7 abuts against the seat tube.

Figure 3:
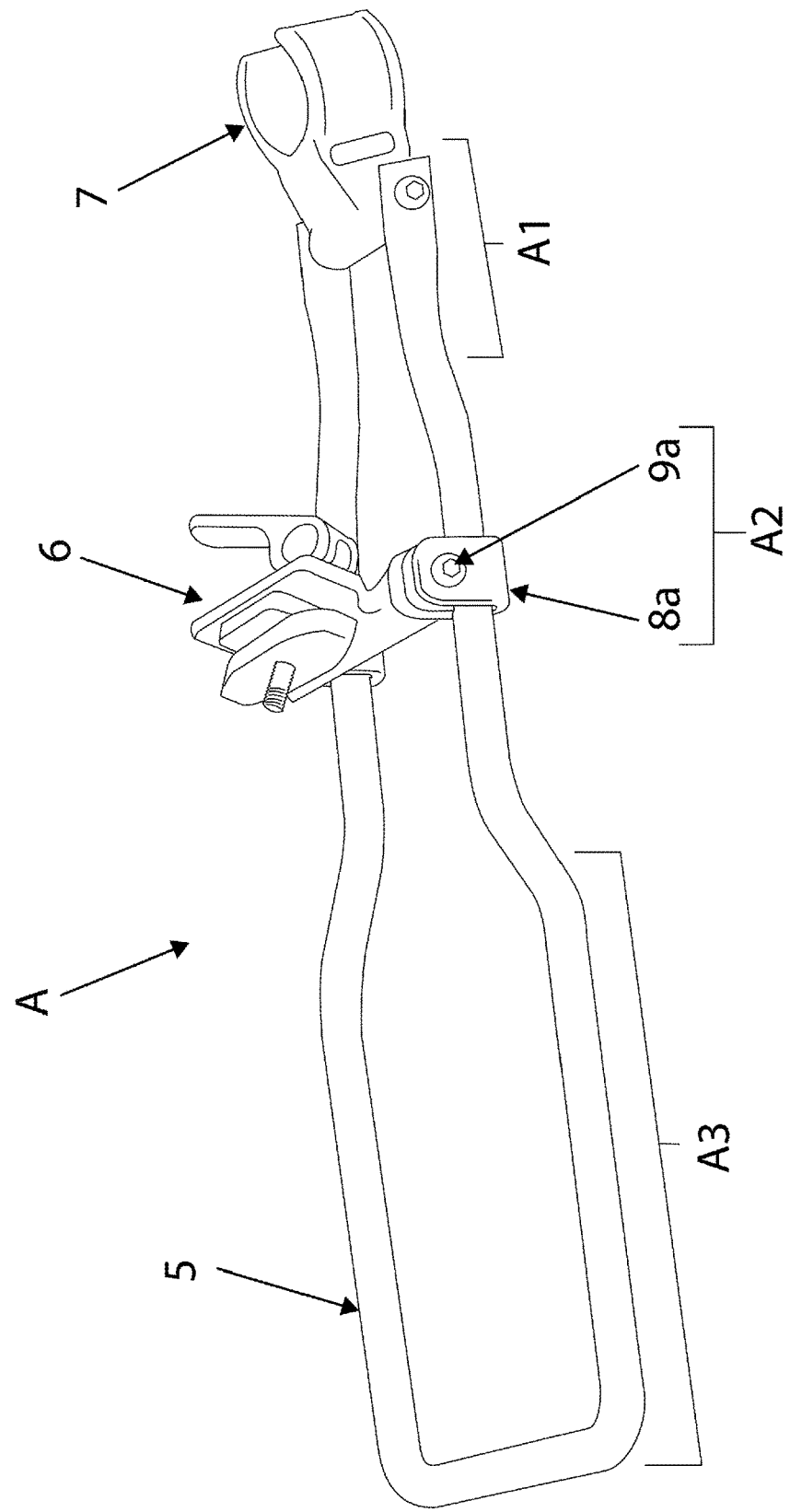
FIG. 3 is a perspective view of the bicycle rack of FIG. 1, as removed from the bicycle.
Figure 4:
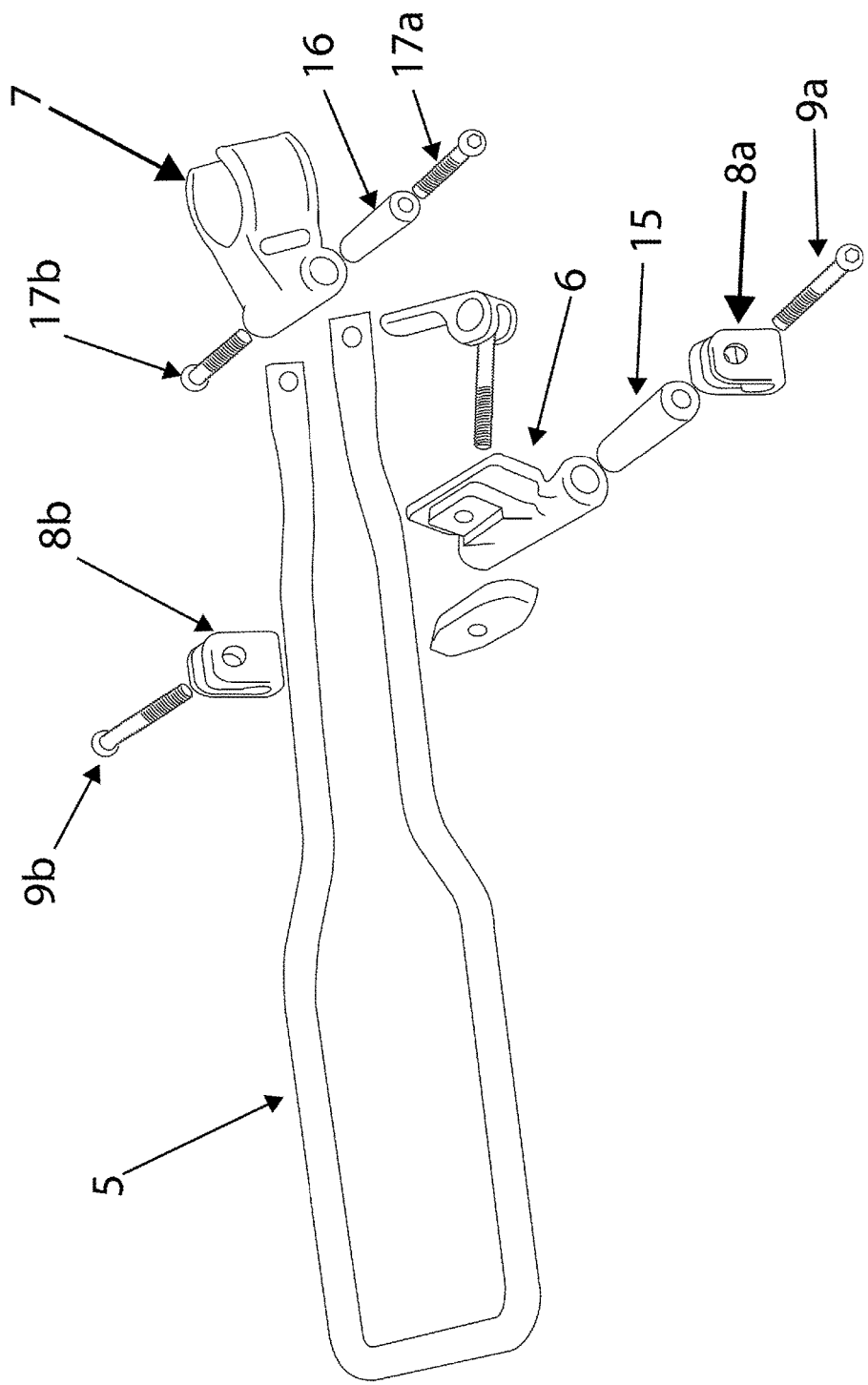
FIG. 4 is an assembly view of the bicycle rack of FIG. 3.

FIGS. 3 and 4 show the rack A with its different components. The frame 5 may have different constructions, but in the illustrated embodiment is made of a bent metal rod that may define three portions, namely a front end portion A1 contacting the seat post 2, elongated frame member(s) A2 through which the frame 5 is connected to the seat 1, and the bag interfacing portion A3, upon which the bag is mounted. Seat rails pivot bracket 6 is connected to sliders 8a and 8b. In an embodiment, the seat rails pivot bracket 6 is bolted to the sliders 8a and 8b, by way of slide bolts 9a and 9b. The sliders 8a and 8b may be U-shaped brackets that form a passage (a.k.a., channel) for the frame members to slide in. The U-shaped brackets may deform when ends of the brackets are brought toward one another by a tightening force. In an embodiment, the sliders 8a and 8b elastically deform to regain an initial shape when the tightening force is released. When the slider bolts 9a and 9b are loose, the sliders 8a and 8b reach their initial shape and a play is formed between them and the frame 5, whereby they can be moved along the straight sections of frame 5. Accordingly, a pair of sliding joints is formed between the slider bolts 9a and 9b and the elongated sections of the frame 5. When the slider bolts 9a and 9b are tightened, the sliders 8a and 8b lock onto frame 5 by applying pressure against the frame 5 via the deformation. As alternatives to slider bolts 9a and 9b, the system may use screws, clamps, quick release mechanism, etc. Moreover, a single slider bolt may be used, such single slider bolt extending from end to end of the frame, and used with a nut to tighten the sliders 8a and 8b. In another embodiment, the sliders 8a and 8b are fixed along the straight sections in the elongated members of the frame 5 and cannot slide.

Figure 5:
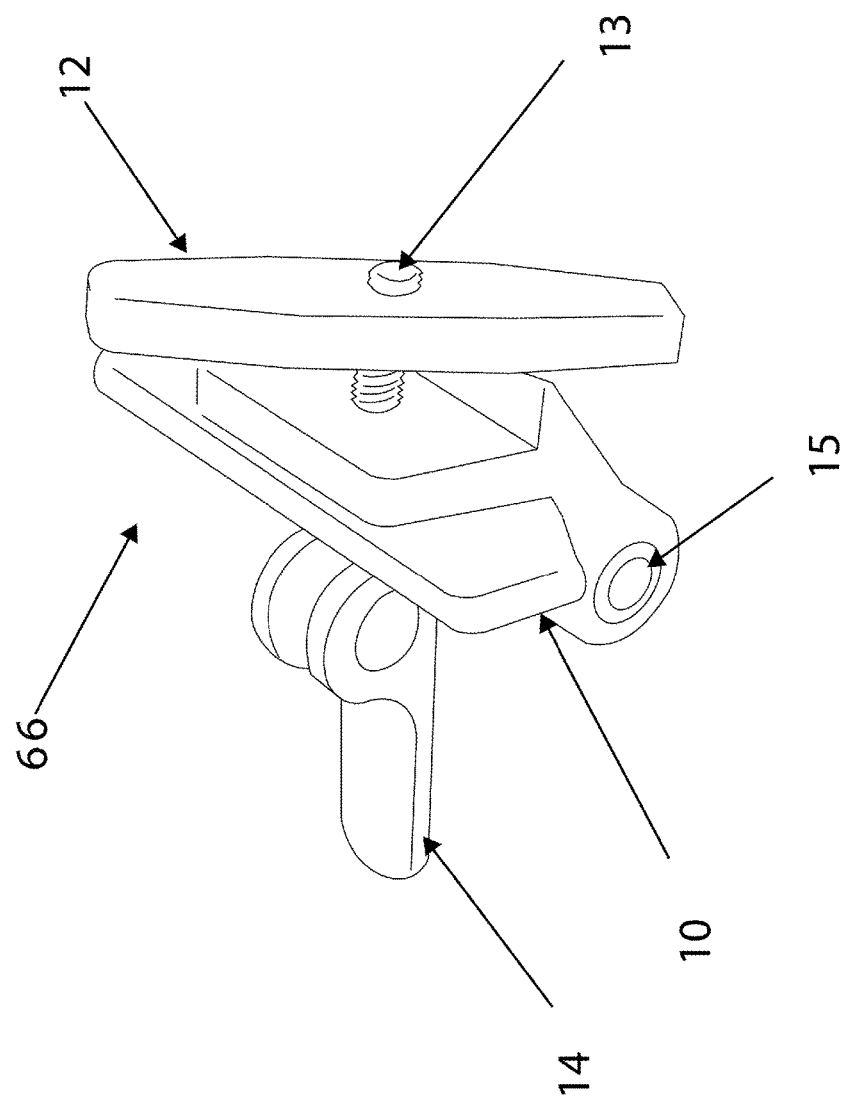
FIG. 5 is a perspective view of a seat rails pivot bracket assembly of the bicycle rack of FIG. 1.

FIG. 5 shows details of the seat rails pivot bracket assembly 6 fitted with a quick release mechanism for ease of installation and removal. The seat rails pivot bracket assembly may have a main body 10 that is connected to seat rails bracket backplate 12 by quick release bolt 13 and quick release lever 14.

Figure 6:
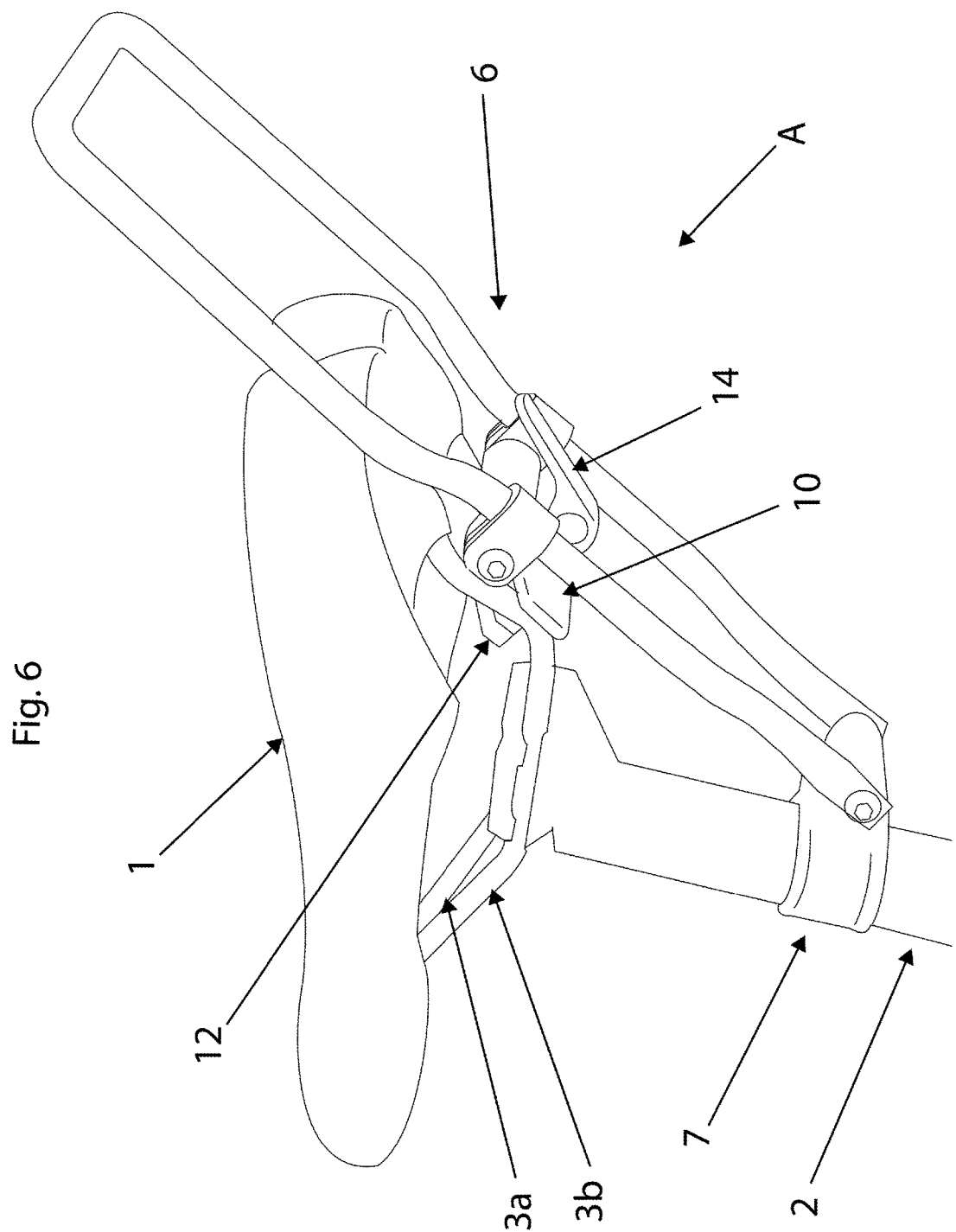
FIG. 6 is a rear perspective view of the bicycle rack of FIG. 1, with bag removed.

FIG. 6 shows the seat rails pivot bracket assembly 6 mounted to the seat rails 3a and 3b. Installation is made by rotating the backplate 12 (e.g., about 45 degrees) so that it can be fitted in between the seat rails 3a and 3b. The backplate 12 is then rotated back (e.g., 45 degrees) so that it is positioned above seat rails 3a and 3b, and is more or less parallel to the main body 10, i.e., the longitudinal dimension of both the main body 10 and the backplate 12 are generally parallel (give or take 10 degrees). In an embodiment, the backplate 12 may be located at the neck of seat rails 3a and 3b where the rails start to angle up. The quick release bolt 13 is then tightened by rotating the quick release lever 14. When appropriate pressure is achieved, the quick release lever 14 is closed shut thereby clamping the seat rails pivot bracket assembly 6 onto the seat rails 3a and 3b, namely by the main body 10 and backplate 12 acting together to sandwich the seat rails 3a and 3b between them. In an embodiment, the main body 10 has a lower hardness than the seat rails 3a and 3b. In another embodiment, a bolt and nut assembly is used instead of the quick release bolt 13 and quick release lever 14.

FIGS. 4 and 5 show a seat rails pivot bracket pin 15 inserted into a corresponding channel in the main body 10 of the seat rails pivot bracket assembly 6, to form a rotational joint. The pivot pin 15 may be tubular, and may be threaded for screwing engagement of fasteners therein, such as the slider bolts 9a and 9b, or equivalent. In another embodiment, a single bolt is inserted directly into the channel of the main body 10, and is used with a nut to tighten both of the sliders 8a and 8b simultaneously. The pivot pin 15 may extend slightly beyond both sides of the main body 10 of the seat rails pivot bracket assembly 6, so that when bolts 9a and 9b shown on FIG. 4 are screwed into the pivot pin 15 with enough torque to tighten sliders 8a and 8b, pressure is applied against the pivot pin 15 and not against the main body 10. Thus, main body 10 of the seat rails pivot bracket assembly 6 remains free to rotate around pivot pin 15 while the sliders 8a and 8b are locked along the frame 5.

FIGS. 3 and 4 also show the seat post pivot bracket 7 connected to the frame 5 by means of a seat post pivot pin 16 and bolts 17a and 17b, connecting the seat post pivot bracket 7 to a holes in a pair of free ends of the frame 5. The seat post pivot pin 16 is received in a corresponding channel of the seat post pivot bracket 7, to form a rotational joint. Pivot pin 16 may also extend slightly beyond both sides of the seat post pivot bracket 7 so that when bolts 17a and 17b are tightened, the seat post pivot bracket 7 may remain free to rotate around the pivot pin 16. Other configurations are contemplated, for instance a single bolt inserted directly into the channel of the seat post pivot bracket 7, and used with a nut at one end. As another embodiment, the frame 5 has a transverse frame member upon which the seat post pivot bracket 7 is rotatingly mounted.

The seat post pivot bracket 7 may be made of any appropriate materials, including polymers and metals. In an embodiment, the seat post pivot bracket 7 is made of a compliant rubberized material (i.e., with hardness low relative to a metal) so that legs of its C-shape portion can elastically deform to open in order to wrap around a wide range of seat post diameters and shapes. Thus, in one possible sequence, the installation of the frame 5 to the seat 1 is made by first connecting and securing the seat rails pivot bracket assembly 6 to seat rails 3a and 3b as described above. Then, the frame 5 may be rotated around the seat rails pivot bracket pin 15 until the seat post pivot bracket 7 abuts firmly against the seat post 2, with the C-shaped portion of the seat post pivot bracket 7 surrounding the seat post 2 or equivalent. Other configurations are contemplated for interfacing the rack to the seat post 2, such as any seat post interface (including the seat post pivot bracket 7) and even a simple abutment. It is also considered to have the frame 5 come into direct contact with the seat post 2.

Seats of bicycles, such as the seat 1, can generally be moved and adjusted fore and aft relative to the seat post 2. The angle of the seat 1 can also be adjusted up or down, i.e., about an axis that is transverse to a plane of the bicycle, i.e., more or less parallel to a crank axis of the bicycle. The sliders 8a and 8b allow positioning of the frame 5 to a preferred angle depending on the bicycle configuration. FIG. 7 shows the action of sliders 8a and 8b as the angle of the frame 5 relative to the seat 1 is changed. For such movements, the sliders 8a and 8b must be loosened, so as to be fixed in position relative to the pivot pin 15, but free to rotate by the rotational joint formed with the pivot pin 15. As the frame 5 is tilted upwards, the straight sections of frame 5 move along the sliders 8a and 8b, while the seat post bracket 7 moves along the seat post 2 until a desired angle for the frame 5 is achieved. The slider bolts 9a and 9b are then tightened to lock the frame 5 into position along the sliders 8a and 8b. Once the bolts 9a and 9b are tightened, the rack A can be removed and installed without having to loosen the bolts 9a and 9b unless a new orientation of the frame 5 is desired. Removal of the frame 5 is achieved simply by reversing the steps done to install it and as described above.

Figure 8:
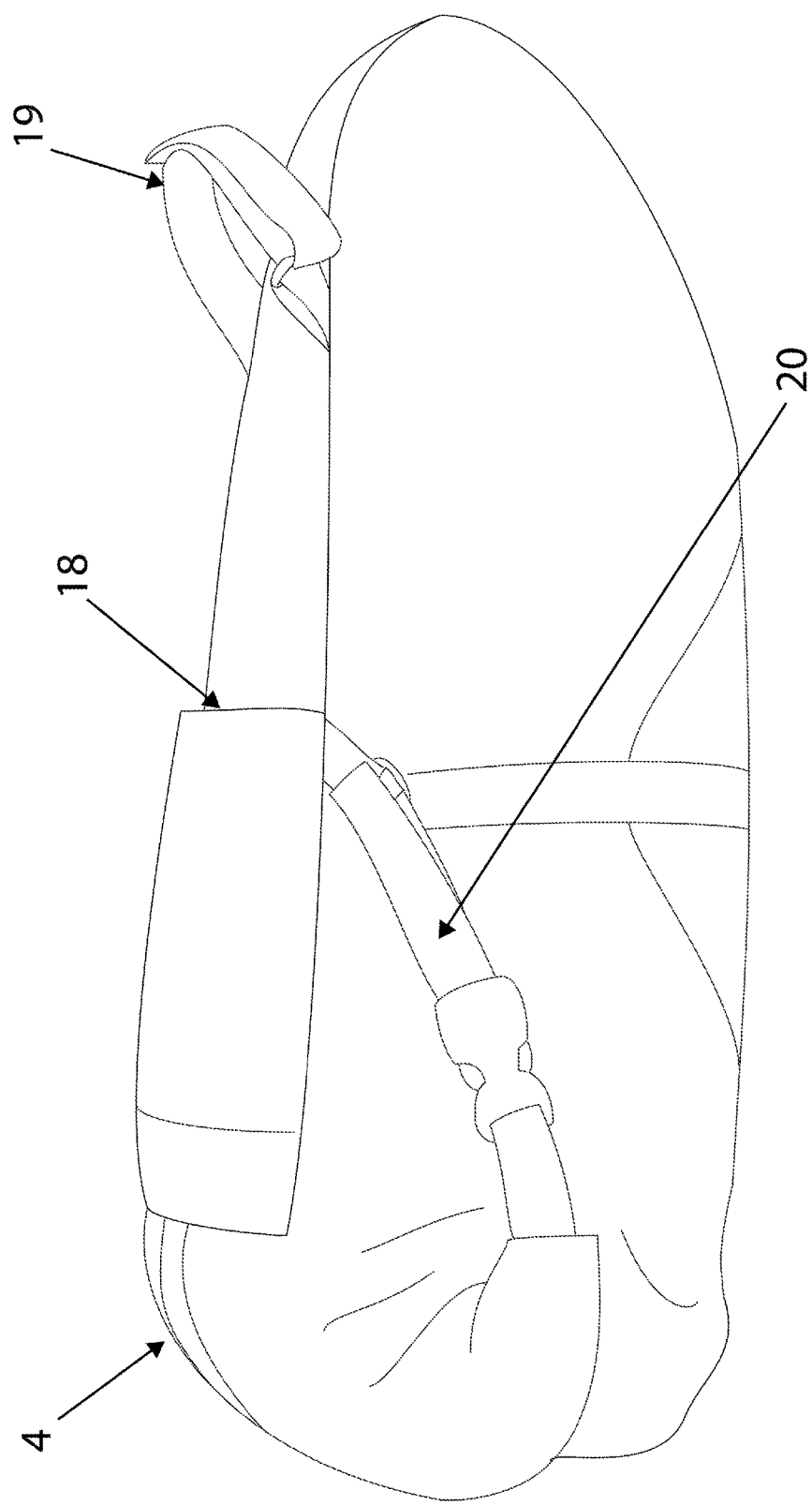
FIG. 8 is a perspective view of the bag of FIG. 1, in accordance with another embodiment of the present disclosure.

FIG. 8 shows an example of a bag 4 with a sleeve pocket 18 and front strap attachment 19, for instance using Velcro® but alternatively with other fastener system. Compression straps 20 may be used to compress and stabilize the content of the bag 4 so that content does not shift inside the bag 4 and so that swaying of the bag 4 is limited.

Figure 9:
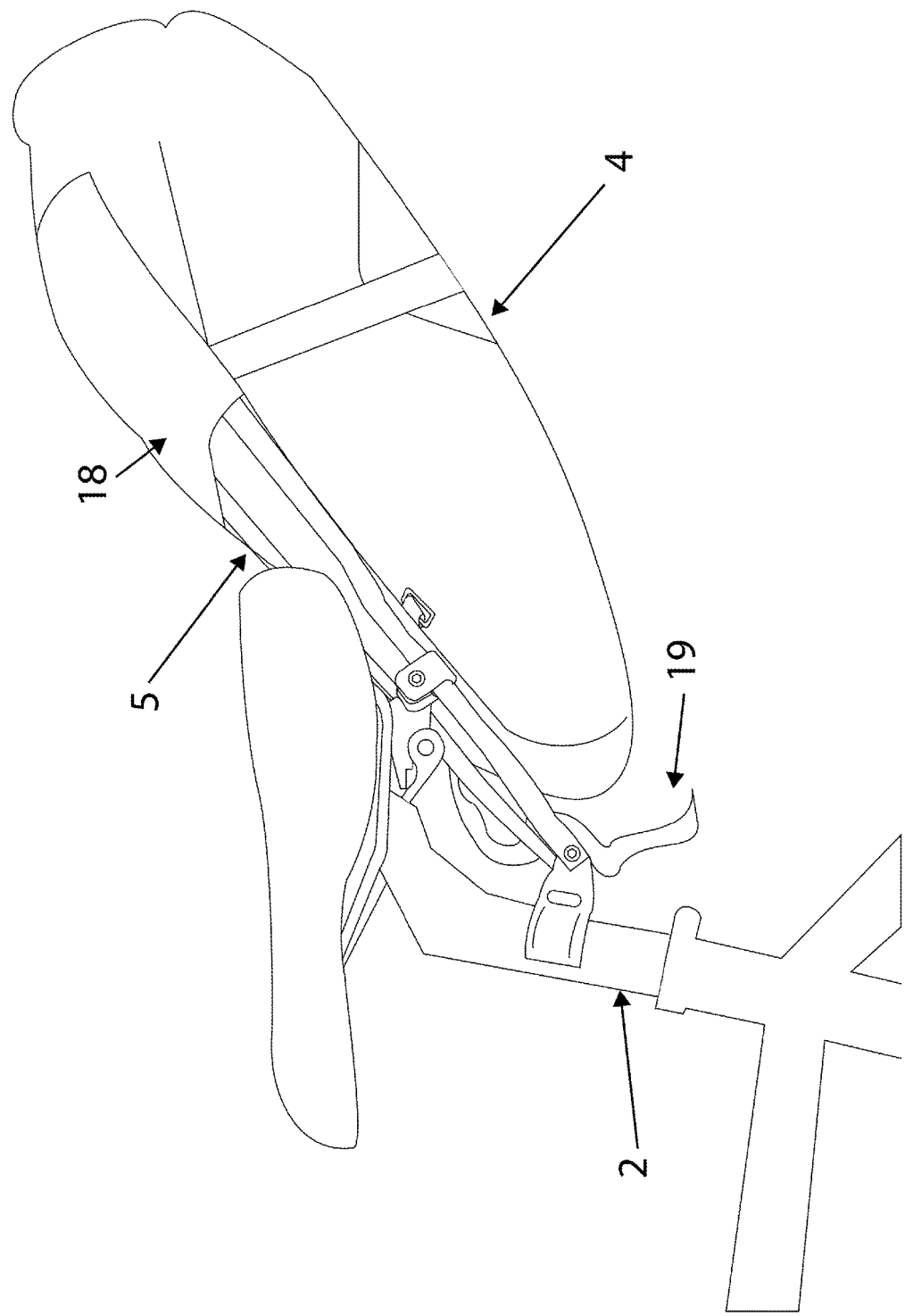
FIG. 9 is a front perspective view of the bicycle rack and bag of FIG. 1 with a focus on a sleeve pocket of the bag.

FIG. 9 shows the bag 4 as it is being attached to the frame 5. Frame 5 is inserted into sleeve pocket 18 as the bag 4 slides along the frame 5. The dimensions of the frame 5 and of the sleeve pocket 18 are such that the fit of frame 5 into sleeve pocket 18 is tight and snug. The rear portion of the sleeve pocket 18 is sewn into bag 4 so that the rear of sleeve pocket 18 is closed. Once in its final position, the rear end of the frame 5 abuts against the rear portion of the sleeve pocket 18 and the strap attachment 19 is wrapped around the seat post 2 to fasten the bag 4 in place as shown in FIG. 1.

Figure 10:
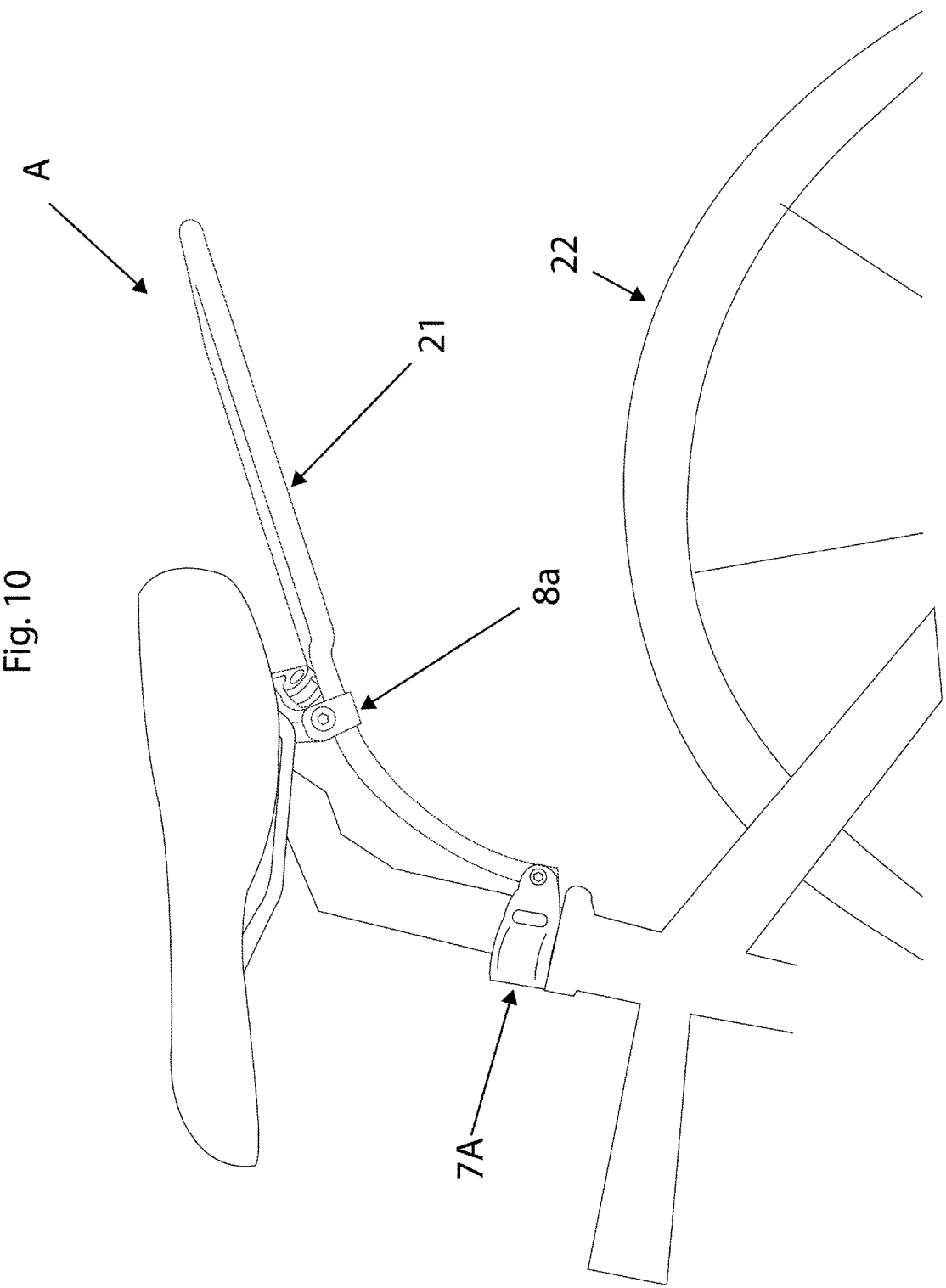
FIG. 10 is a perspective view of a bicycle rack in accordance with yet another embodiment of the present disclosure, as mounted to a bicycle, in a higher orientation.
Figure 11:
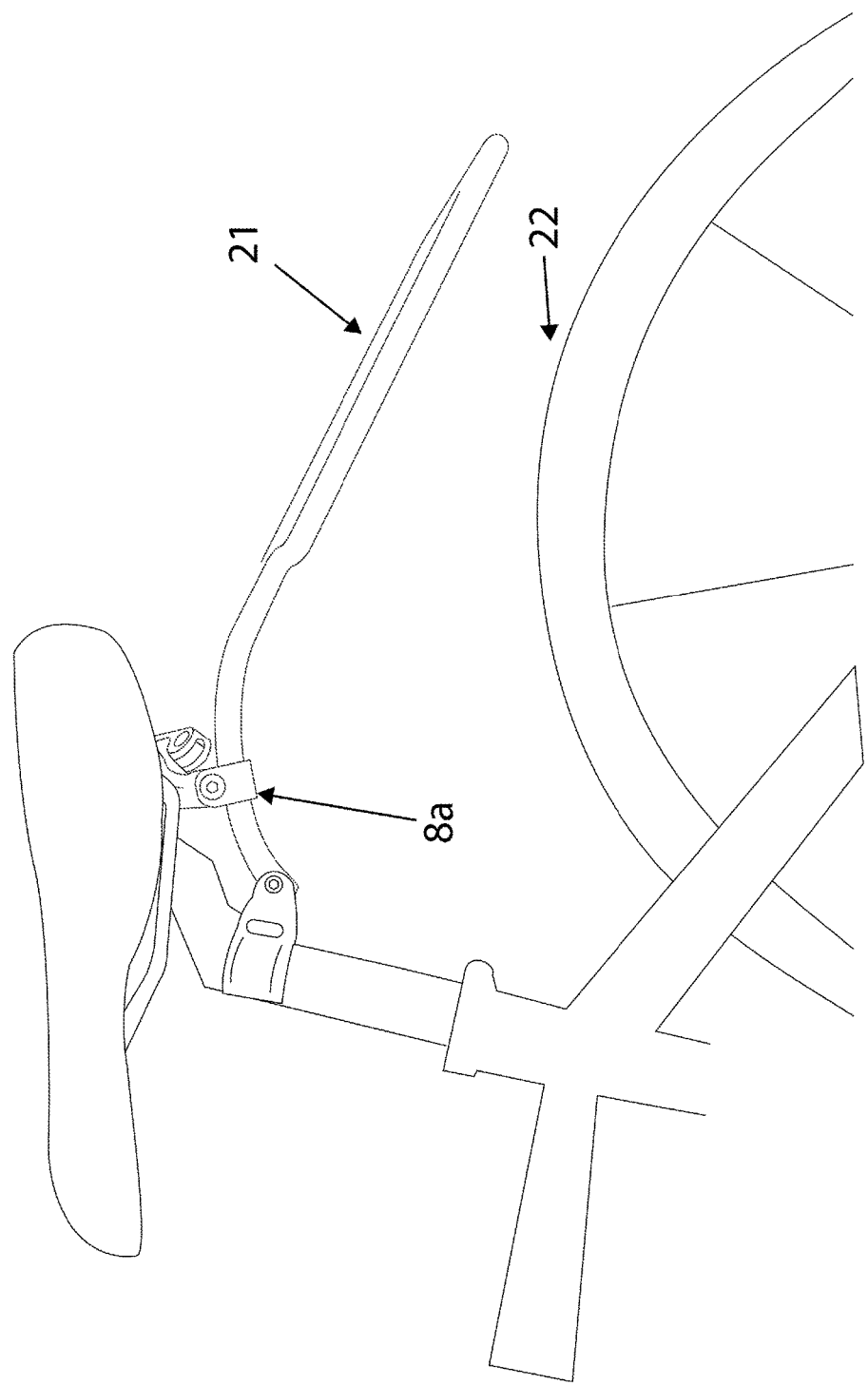
FIG. 11 is a perspective view of the bicycle rack of FIG. 10, in a lower orientation.

FIG. 10 shows another embodiment of the rack A in accordance with the present disclosure. As the racks of FIGS. 1-9 and 10-17 have many components in common, like reference numerals will refer to like components. In the elongated member portion A2, the frame 21 has a curved frame portion along which sliders 8a and 8b can be moved, as opposed to frame 5 in FIGS. 1-9 in which this portion is straight. Stated differently, the curved frame portion has the elongated frame members in the form of arches, i.e., they are arcuate. The curved portion may create more clearance of the rear portion of frame 21 relative to top of tire 22, in contrast to the frame 5. For example, FIG. 11 shows the frame 21 as it is angled to a lower orientation while FIG. 10 shows the frame 21 at a higher orientation. Although a pair of these arcuate elongated frame members are shown, it is contemplated to have a single one, with a single one of the sliders. In such a case, a diameter of the arcuate elongated frame member may be greater than when a pair are present.

Figure 12:
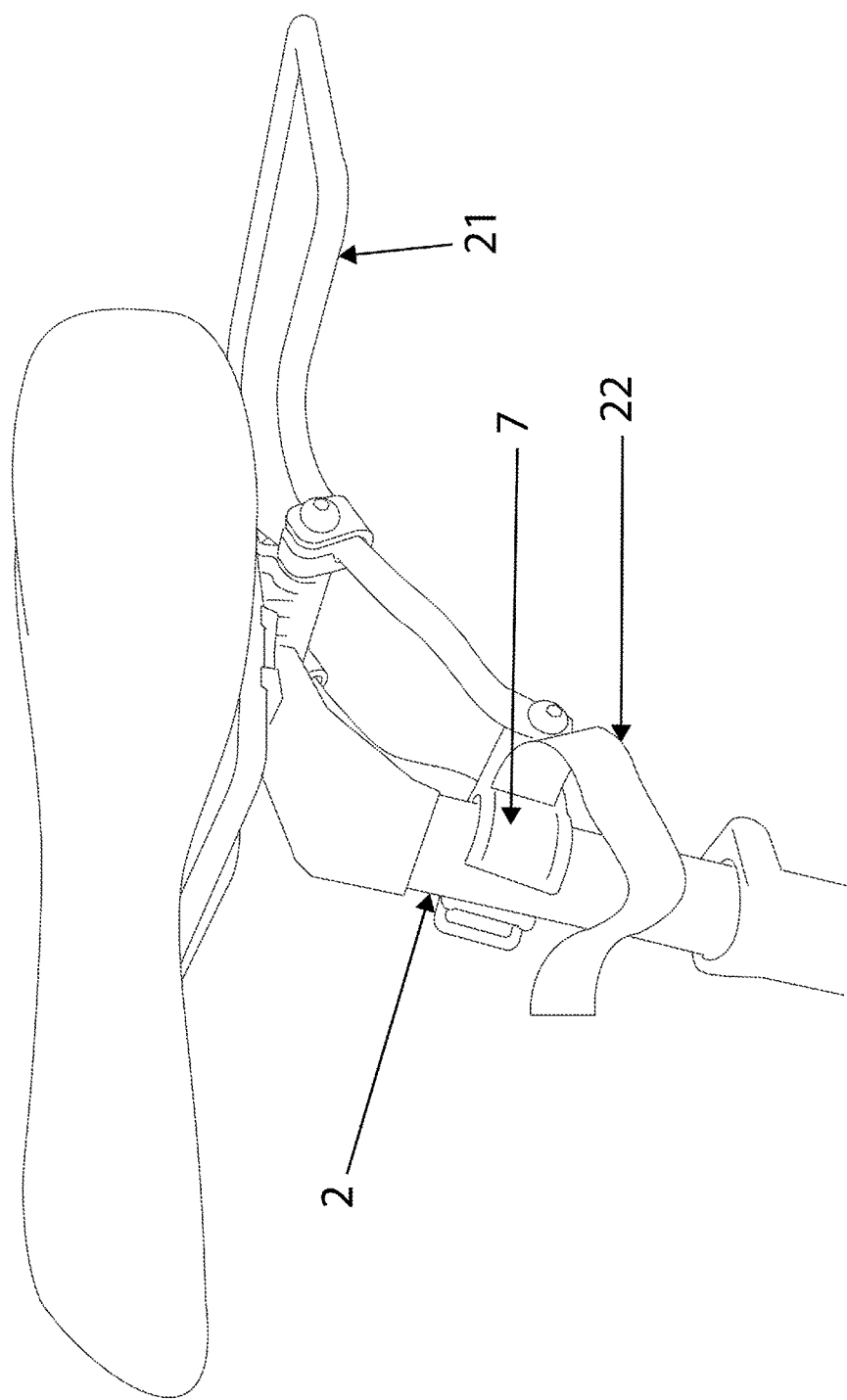
FIG. 12 is an enlarged view of a seat post attachment of the bicycle racks.

FIG. 12 shows an attachment 7A that wraps around the seat post 2 and the seat post pivot bracket 7 to fasten the frame 21 in place and prevent the seat post pivot bracket 7 from disengaging from seat post 2. The attachment 7A may be a strap with appropriate fasteners (e.g., Velcro®) and a buckle, but rope, elastics, etc may also be used. Although not shown, the rack A of FIGS. 1-9 may have the attachment 7A.

Figure 13:
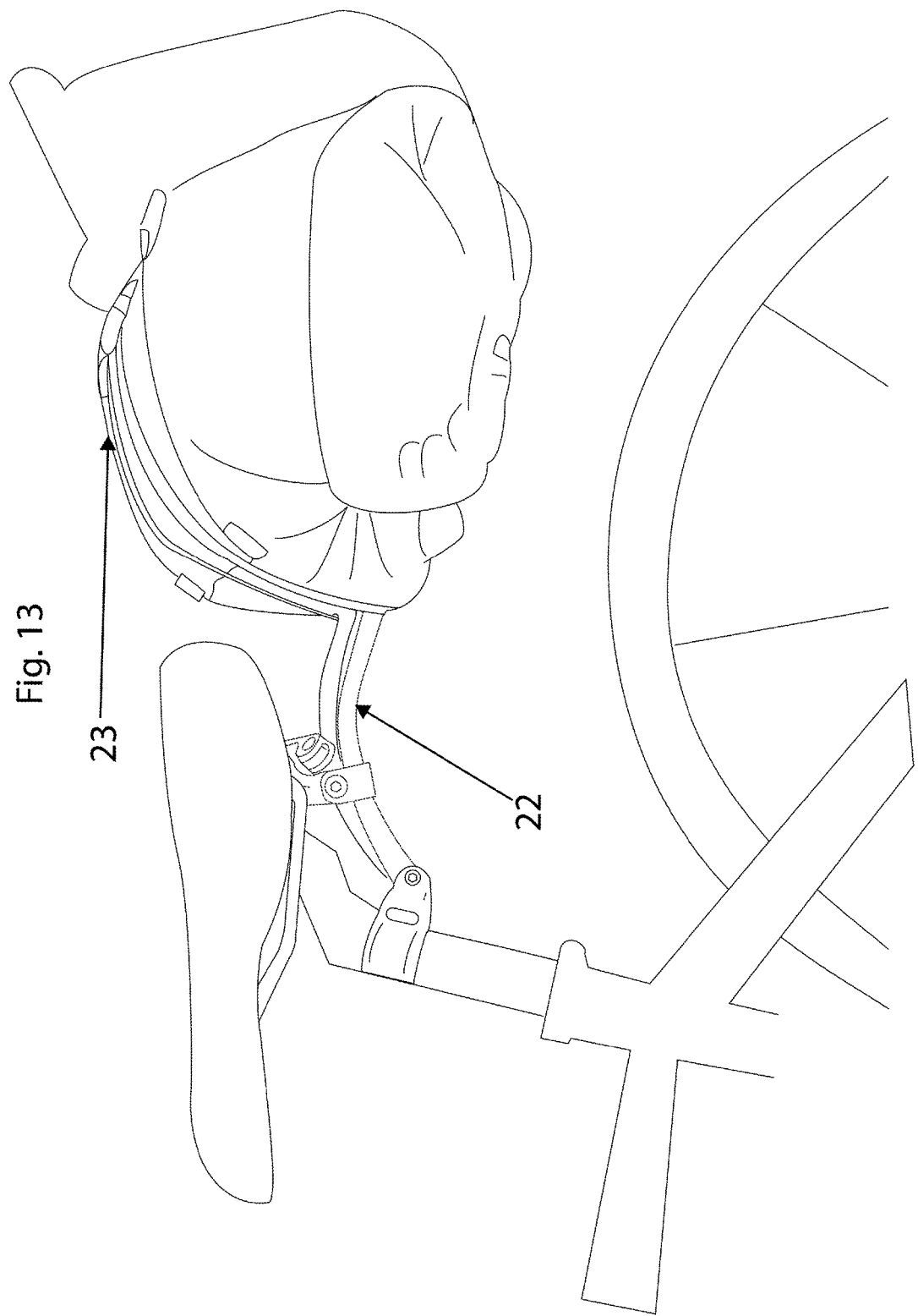
FIG. 13 is a perspective view of the bicycle rack of FIG. 10, with a bag mounted on top of the bicycle rack.
Figure 14:
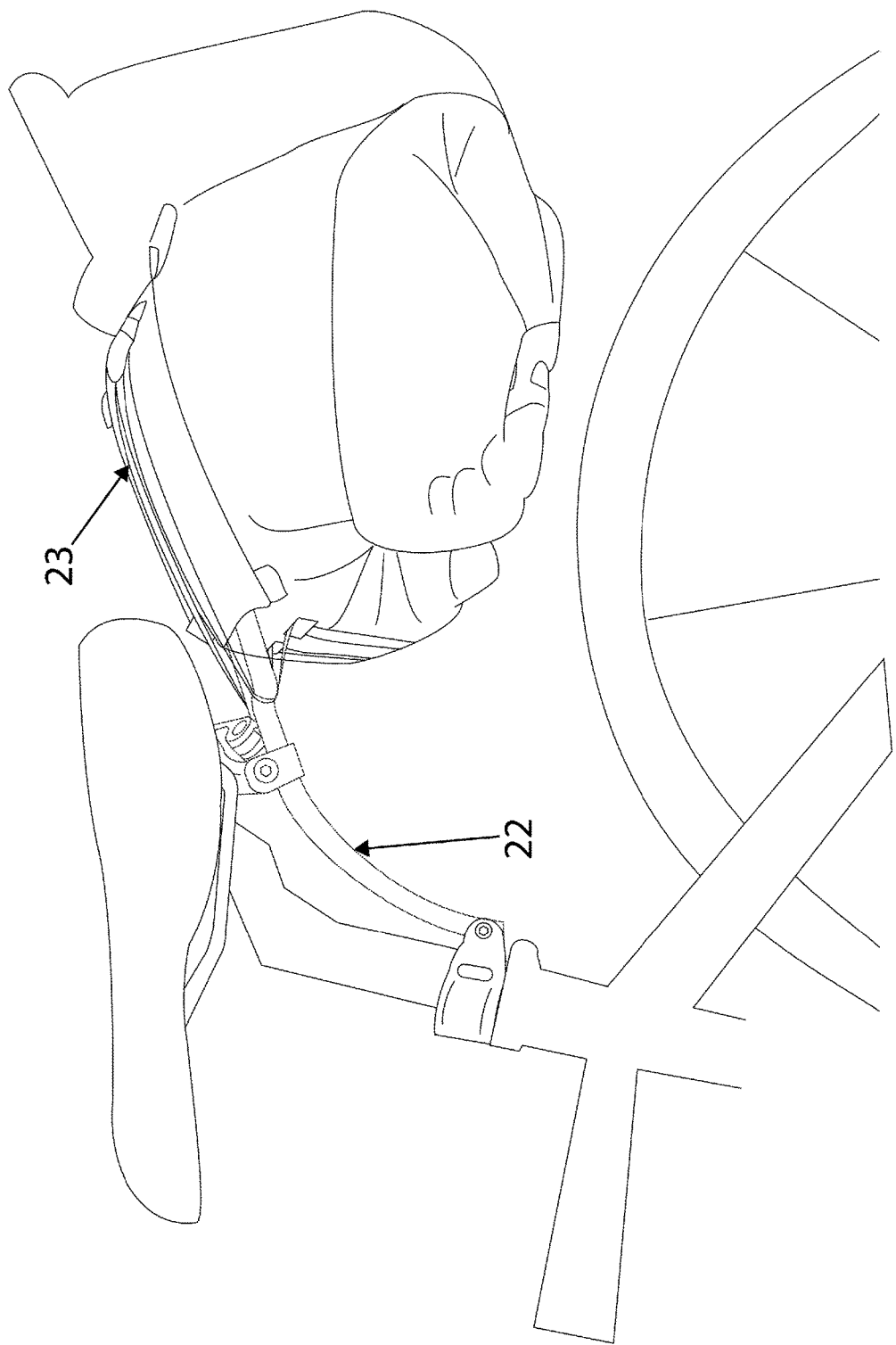
FIG. 14 is a perspective view of the bicycle rack of FIG. 10, with a bag mounted under the bicycle rack.
Figure 15:
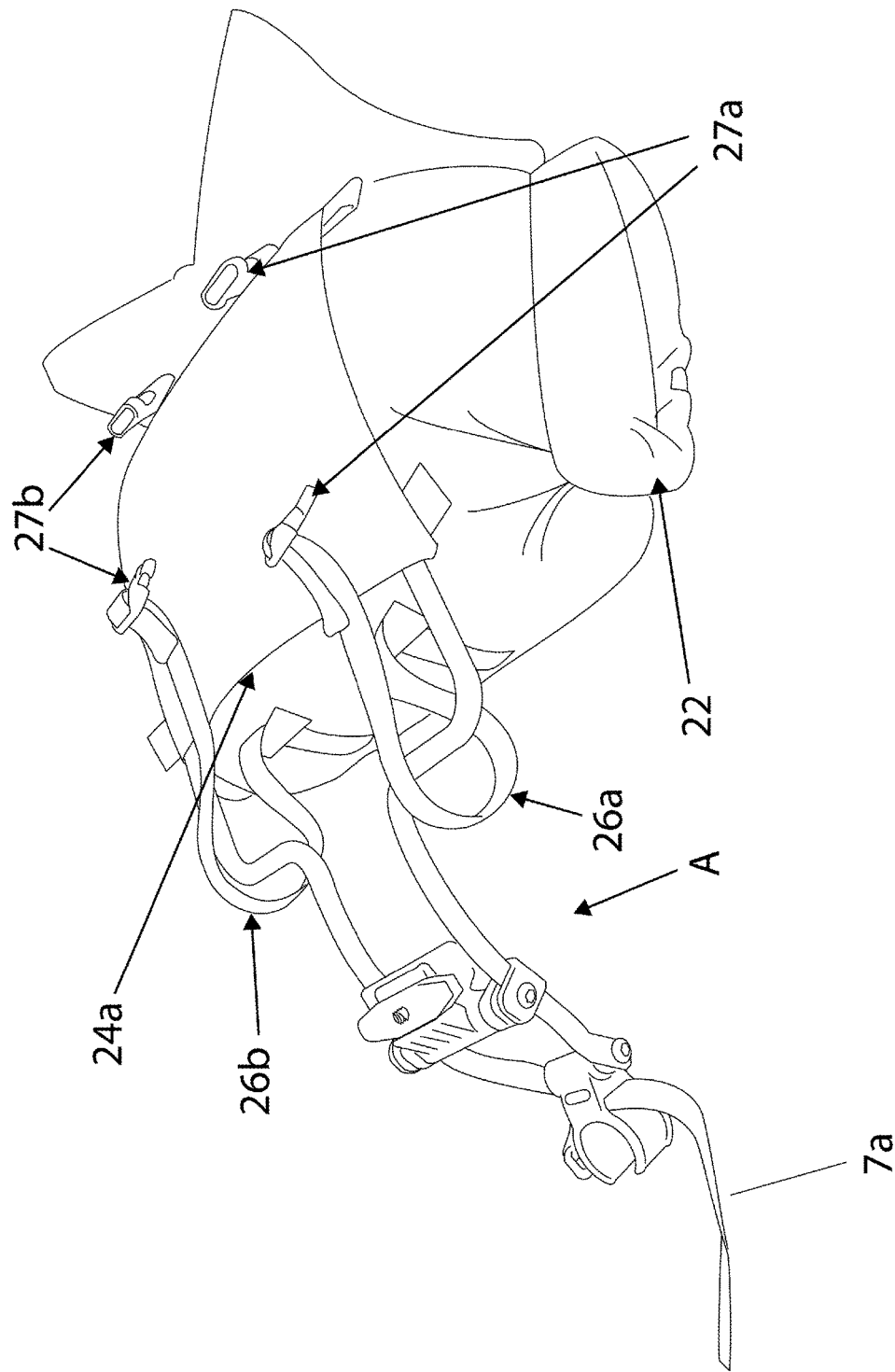
FIG. 15 is a perspective view of the bicycle rack and bag assembly of FIG. 14, removed from the bicycle.
Figure 16:
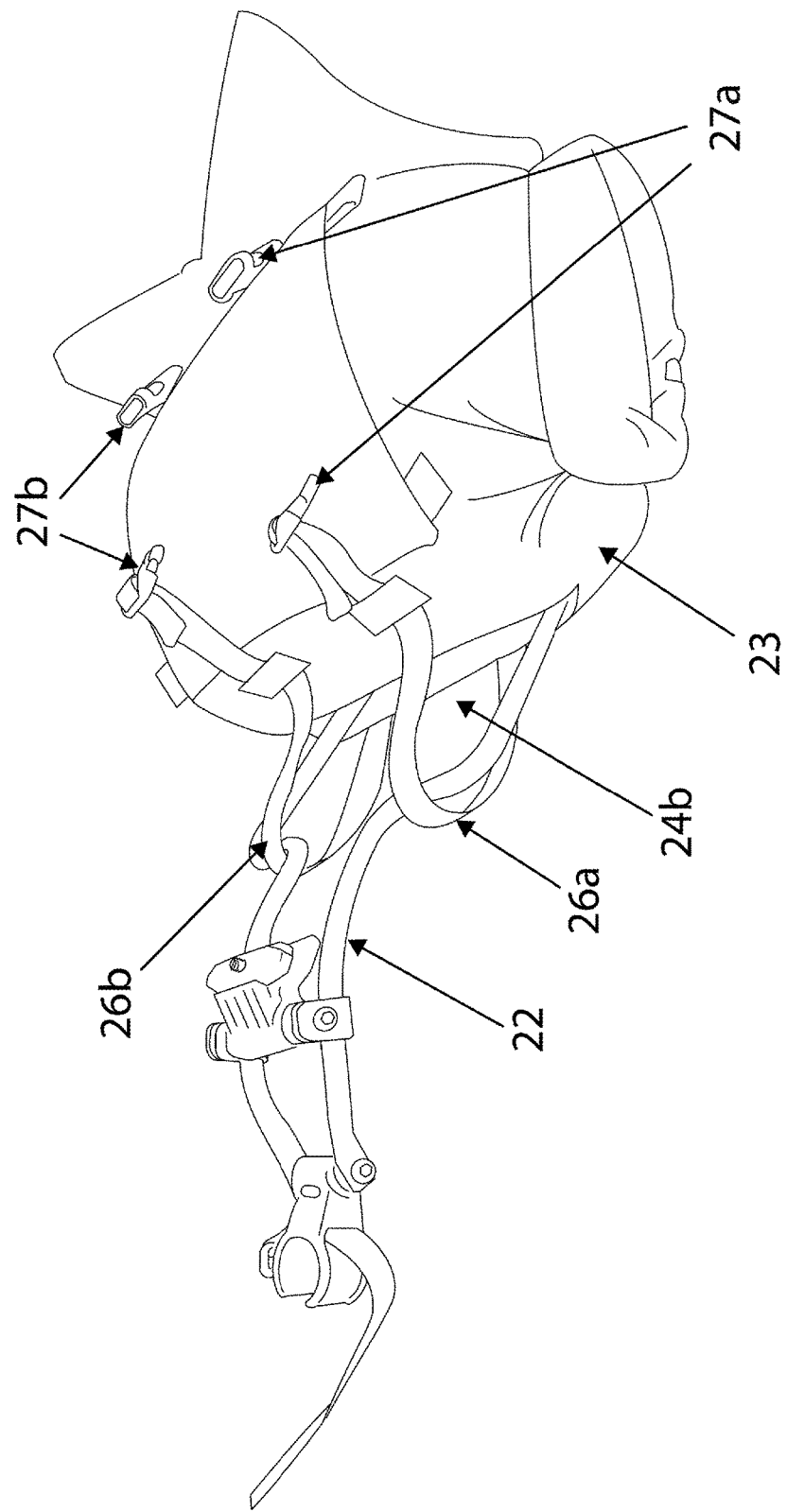
FIG. 16 is a perspective view of the bicycle rack and bag assembly of FIG. 13, removed from the bicycle.

FIG. 13 shows a bag 23 that is fitted above the frame 21 while FIG. 14 shows the bag 23 fitted underneath the frame 21. Bag 23 has a similar sleeve pocket as the bag 5 of FIG. 8 but the bag 23 may have a sleeve pocket both on its top portion 24a as shown in FIG. 15 and on its bottom portion 24b as shown in FIG. 16.

Figure 17:
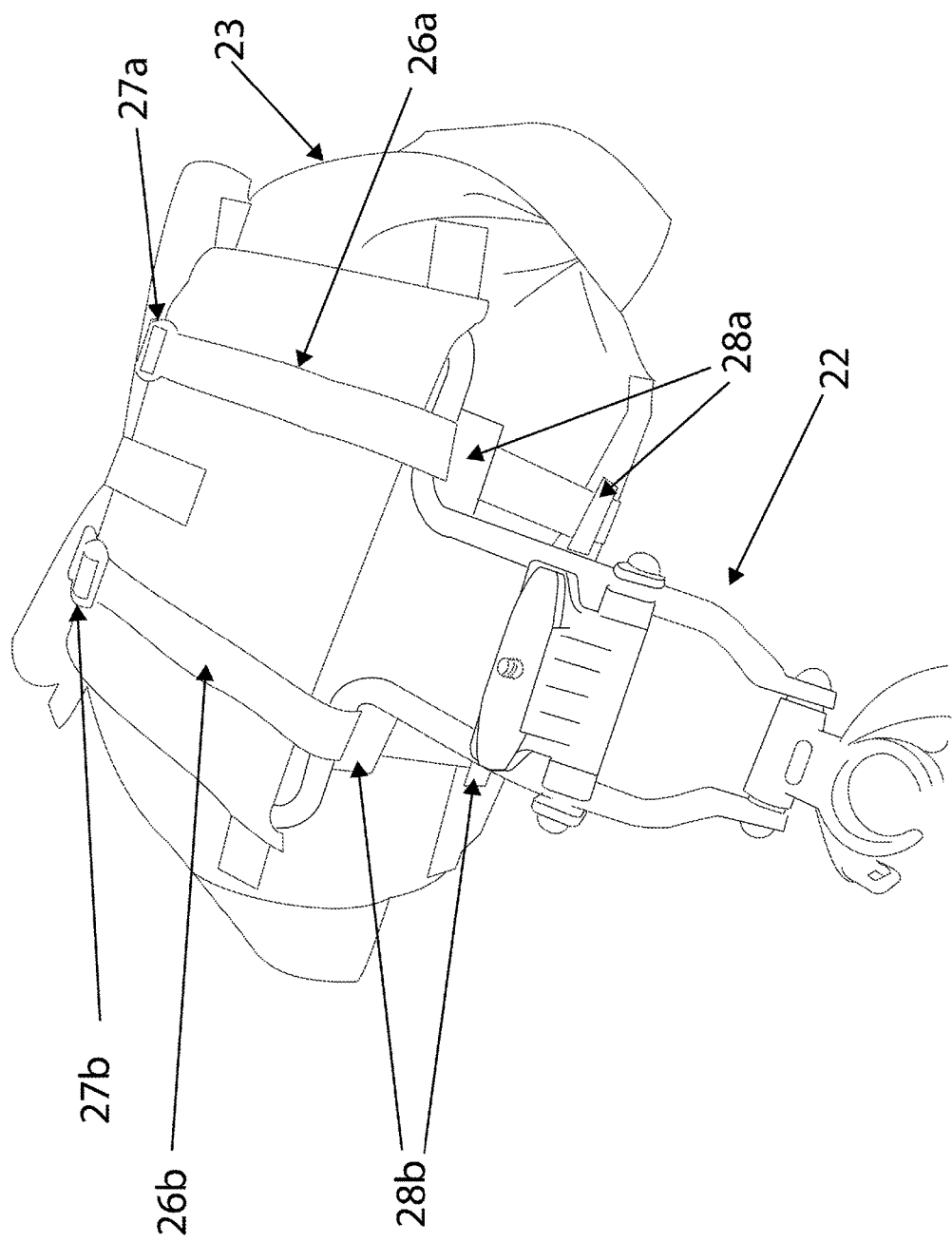
FIG. 17 is a perspective view showing an attachment of the bicycle rack and bag assembly of FIG. 15.

FIG. 17 shows compression straps 26a and 26b that are threaded into compression strap tabs 28a and 28b (a.k.a., hoops) that are sewn onto the bag 23. The compression straps 26a and 26b wrap all around the bag 23 and are attached to mechanical buckles 27a and 27b. Once frame 21 is snugly in place inside either the top sleeve pocket 24a or the bottom sleeve pocket 24b, the buckles 27a and 27b are clipped closed and compression straps 26a and 26b are cinched down. The bag 23 is thus stabilized and fastened in place onto the frame 21. When compression straps 26a and 26b are tight, the compression strap tabs 28a and 28b prevent the compression straps 26a and 27b from sliding towards the outside corners of the frame 21 so that bag 23 cannot not slide off of frame 22.

Figure 18:
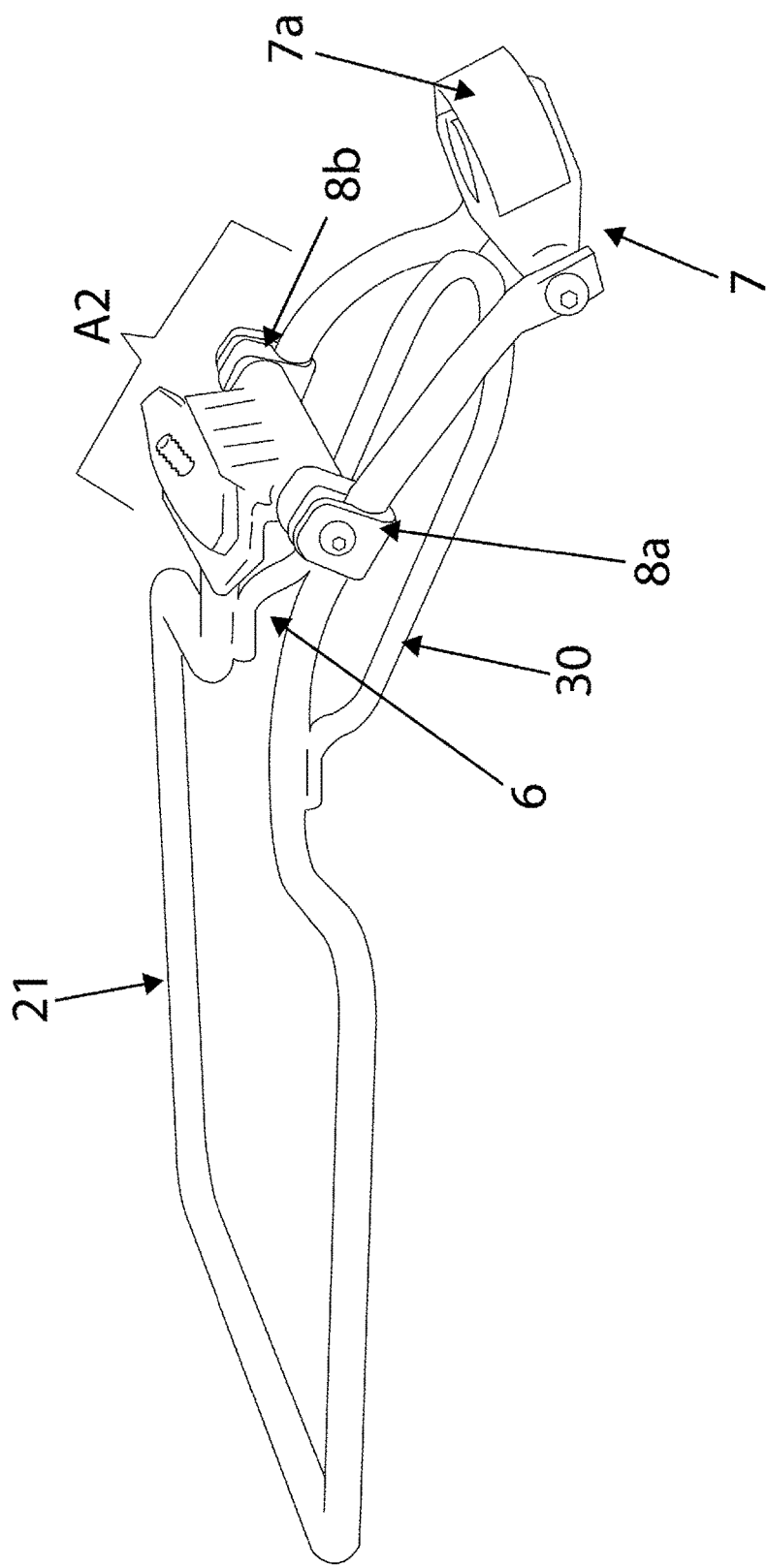
FIG. 18 is a perspective view of the bicycle rack of FIG. 10, with a reinforcement member, in accordance with yet another embodiment of the present disclosure.

FIG. 18 shows another version of the frame 21, in which a reinforcement member 30 is connected to opposite ends of the curved portion of the frame 21. The reinforcement member 30 is in the form of a U-shaped bracket, but other configurations are contemplated as well. The reinforcement member 30 forms a "D" with curved members, to add to the stiffness of the frame 21.

The invention claimed is:
1. A cycle rack comprising:
  a seat attachment assembly configured for attachment of the rack to rails of a seat;
  a seat post interface configured to abut a seat post;
  a frame having a bag interfacing portion adapted to support a bag, a front end portion connected to the seat post interface, and a pair of elongated frame members extending from the front end portion to the bag interfacing portion, each of the elongated frame members including an arch defined by an arcuate rod portion, the arches being side by side;
  a pair of sliders connected to the seat attachment assembly, each of the sliders forming a channel for each individually receiving therein a respective one of the arch of the elongated frame members so as to allow sliding movement of the elongated frame members relative to the sliders.
2. The cycle rack according to claim 1, further comprising at least one reinforcement member extending from end to end of the each one the arches.

3. The cycle rack according to claim 1, wherein the sliders each are a U-shaped bracket connected to the seat attachment assembly.

4. The cycle rack according to claim 1, wherein the sliders are pivotally connected to the seat attachment assembly.

5. The cycle rack according to claim 4, wherein the sliders are connected to a pivot pin rotatably mounted to a body of the seat attachment assembly.

6. The cycle rack according to claim 4, further comprising at least one fastener to deform the sliders into locking movement of the elongated frame members in the channels.

7. The cycle rack according to claim 6, comprising a respective one of the fastener for each of the sliders.

8. The cycle rack according to claim 6, wherein the sliders are connected to a pivot pin by the at least one fastener, the pivot pin rotatably mounted to a body of the seat attachment assembly so as to be free to rotate while the sliders lock movement of the elongated frame members in the channels.

9. The cycle rack according to claim 1, wherein the frame is made of a single bent rod.

10. The cycle rack according to claim 1, further comprising a rotational joint between the front end portion of the frame and the seat post interface.

11. A cycle rack comprising:
a seat attachment assembly configured for attachment of the rack to rails of a seat;
a seat post interface configured to abut a seat post;
a frame having a bag interfacing portion adapted to support a bag, a front end portion connected to the seat post interface, and at least one elongated frame member extending from the front end portion to the bag interfacing portion, the at least one elongated frame member including an arch defined by an arcuate rod portion; and
at least one slider connected to the seat attachment assembly, and forming a channel for receiving therein the arch of the elongated frame member so as to allow sliding movement of the arch of the at least one elongated frame member relative to the slider to impart a rotation of the bag interface portion relative to the at least one slider.

12. The cycle rack according to claim 11, further comprising at least one reinforcement member extending straight from an end to another end of the arch of the elongated frame member.

13. The cycle rack according to claim 11, wherein the at least one slider is a U-shaped bracket connected to the seat attachment assembly.

14. The cycle rack according to claim 11, wherein the slider is pivotally connected to the seat attachment assembly.

15. The cycle rack according to claim 14, comprising a pair of the sliders and a pair of the arcuate elongated frame member, the sliders being connected to a pivot pin rotatably mounted to a body of the seat attachment assembly.

16. The cycle rack according to claim 15, further comprising at least one fastener to deform the sliders into locking movement of the arcuate elongated frame members in the channels.

17. The cycle rack according to claim 16, comprising a respective one of the fastener for each of the sliders.

18. The cycle rack according to claim 16, wherein the sliders are connected to a pivot pin by the at least one fastener, the pivot pin rotatably mounted to a body of the seat attachment assembly so as to be free to rotate while the sliders lock movement of the arcuate elongated frame members in the channels.

* * * * *